(12) United States Patent
Garg (10) Patent No.: US 9,961,928 B2
(45) Date of Patent: May 8, 2018

(54) REFRIGERATOR DEFROST COMPARTMENT

(71) Applicant: 8318808 Canada Inc., Milton (CA)

(72) Inventor: Neeraj Garg, Milton (CA)

(73) Assignee: 8318808 CANADA INC. (CA)

( * ) Notice: Subject to any disclaimer, the term of this patent is extended or adjusted under 35 U.S.C. 154(b) by 182 days.

(21) Appl. No.: 14/852,865

(22) Filed: Sep. 14, 2015

(65) Prior Publication Data

US 2017/0071234 A1    Mar. 16, 2017

(51) Int. Cl.
*F27D 11/00*    (2006.01)
*A23L 3/365*    (2006.01)

(52) U.S. Cl.
CPC .................... *A23L 3/365* (2013.01)

(58) Field of Classification Search
CPC . A23L 3/365; A23L 3/005; A23L 3/32; A23L 3/36; F25D 23/04; F25D 23/12; F25D 21/002; F25D 21/004; F25D 21/006; F25D 21/08; F25D 31/005; A23V 2002/00
USPC ....... 219/218, 388, 392, 400, 505, 523, 542, 219/553, 385; 62/3.2, 80, 126, 155, 163, 62/234, 274, 407
See application file for complete search history.

(56) References Cited

U.S. PATENT DOCUMENTS

| 4,727,801 | A  | * | 3/1988  | Yokoi ..................... | A23L 3/365 99/474 |
| 2011/0016887 | A1 | * | 1/2011  | Lee ......................... | A23L 3/365 62/3.2 |
| 2015/0285552 | A1 | * | 10/2015 | Swaidan ................. | F25D 23/12 62/80 |
| 2016/0320118 | A1 | * | 11/2016 | Millett .................. | F25D 31/005 |

* cited by examiner

*Primary Examiner* — Hung D Nguyen
(74) *Attorney, Agent, or Firm* — Anil Bhole; Marc Lampert; Bhole IP Law (57) ABSTRACT

Embodiments described herein relate to a refrigerator including a defrost chamber for defrosting food. The defrost chamber is fluidly coupled to the ambient air surrounding the refrigerator so that the chamber can be selectively returned to ambient temperature during a defrost cycle in order to defrost food. A control module can be included to activate a defrost cycle after a predetermined amount of time, or in advance of a desired meal time. The control module can automatically determine an anticipated defrost duration, given an input weight and type of stored food. Therefrom, the control module can activate the defrost cycle sufficiently in advance of the desired meal time to ensure that food has adequately defrosted for use. Further, after the defrost cycle has elapsed, cooling can be automatically reactivated in order to avoid food spoilage.

13 Claims, 7 Drawing Sheets

REFRIGERATOR DEFROST COMPARTMENT

TECHNICAL FIELD

The following relates generally to refrigerators and more specifically to refrigerator defrost compartments.

BACKGROUND

Conventional refrigerators often comprise two chambers, each of which may have a plurality of compartments and/or shelves. A first chamber, referred to as a refrigeration chamber, can be kept a few degrees above zero degrees Celsius. A second chamber, referred to as a freezer chamber, can be kept below zero.

As food tends to spoil at different rates depending on storage temperature, some food may be kept in the refrigeration chamber while other food may be kept in the freezer chamber. Often, food intended to be consumed in the short term is kept in the refrigeration chamber, while food intended to be stored for longer is kept in the freezer chamber.

When it is desired to use refrigerated food for cooking, it may be preferable to defrost the food before use. Defrosting food may be accomplished, for example, by leaving food sitting out at ambient temperature until thawed to a diner's satisfaction, or by microwaving the food—saving time, but possibly ruining taste.

A disadvantage of leaving food to defrost at ambient temperature is that the amount of time taken to defrost food is highly variable, depending on, for example, the starting temperature of the food, the ambient temperature, the size, thermal density and surface area of the food, the ambient temperature, and the type of food. Owing in part to the inherent variability of required defrost time and in part to frailties of the memory of diners, once left out, food is often forgotten, causing it to sit for too long at ambient and spoil.

SUMMARY

In one aspect, a defrost chamber is provided for receiving food, the defrost chamber comprising: two or more heat transfer conduits, one of said conduits selectively fluidly coupled to an ambient air source and another of said conduits selectively fluidly coupled to refrigeration equipment for cooling air in the defrost chamber; a user input module for receiving user input; and a control module configured to: determine a weight of the food stored in the defrost chamber; receive user input indicating a desired meal time; automatically generate an anticipated defrost duration corresponding to an expected length of time for the food to defrost; and selectively control, for a period corresponding to the anticipated defrost duration in advance of the desired meal time, the heat transfer conduits to supply ambient air to the food.

In another aspect, a method is provided for controlling a defrost chamber having two or more heat transfer conduits, one of said conduits selectively fluidly coupled to an ambient air source and another of said conduits selectively fluidly coupled to refrigeration equipment for cooling air in the defrost chamber, the method comprising: determining, by a control module, a weight of the food stored in the defrost chamber of the refrigerator; receiving user input at a user input module indicating a desired meal time; automatically generating an anticipated defrost duration corresponding to an expected length of time for the food to defrost; and selectively controlling, for a period corresponding to the anticipated defrost duration in advance of the desired meal time, the heat transfer conduits to supply ambient air to the food.

These and other aspects are contemplated and described herein. It will be appreciated that the foregoing summary sets out representative aspects of systems and methods for document management for sharing documents according to document category to assist skilled readers in understanding the following detailed description.

DESCRIPTION OF THE DRAWINGS

A greater understanding of the embodiments will be had with reference to the Figures, in which.

DETAILED DESCRIPTION

For simplicity and clarity of illustration, where considered appropriate, reference numerals may be repeated among the Figures to indicate corresponding or analogous elements. In addition, numerous specific details are set forth in order to provide a thorough understanding of the embodiments described herein. However, it will be understood by those of ordinary skill in the art that the embodiments described herein may be practised without these specific details. In other instances, well-known methods, procedures and components have not been described in detail so as not to obscure the embodiments described herein. Also, the description is not to be considered as limiting the scope of the embodiments described herein.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

Any module, unit, component, server, computer, terminal, engine or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Further, unless the context clearly indicates otherwise, any processor or controller set out herein may be implemented as a singular processor or as a plurality of processors. The plurality of processors may be arrayed or distributed, and any processing function referred to herein may be carried out by one or by a plurality of processors, even though a single processor may be exemplified. Any method, application or module herein described may be implemented using computer readable/executable instructions that may be stored or otherwise held by such computer readable media and executed by the one or more processors.

Embodiments described herein relate to a refrigerator comprising a defrost chamber for defrosting food. The defrost chamber is fluidly coupled to the ambient air surrounding the refrigerator so that the chamber can be selectively returned to ambient temperature during a defrost cycle in order to defrost food. A control module can be included to activate a defrost cycle after a predetermined amount of time, or in advance of a desired meal time. The control module can automatically determine an anticipated defrost duration, given an input weight and possibly type of stored food. Therefrom, the control module can activate the defrost cycle sufficiently in advance of the desired meal time to ensure that food has adequately defrosted for use. Further, after the defrost cycle has elapsed, cooling can be automatically reactivated in order to avoid food spoilage.

Figure 1:
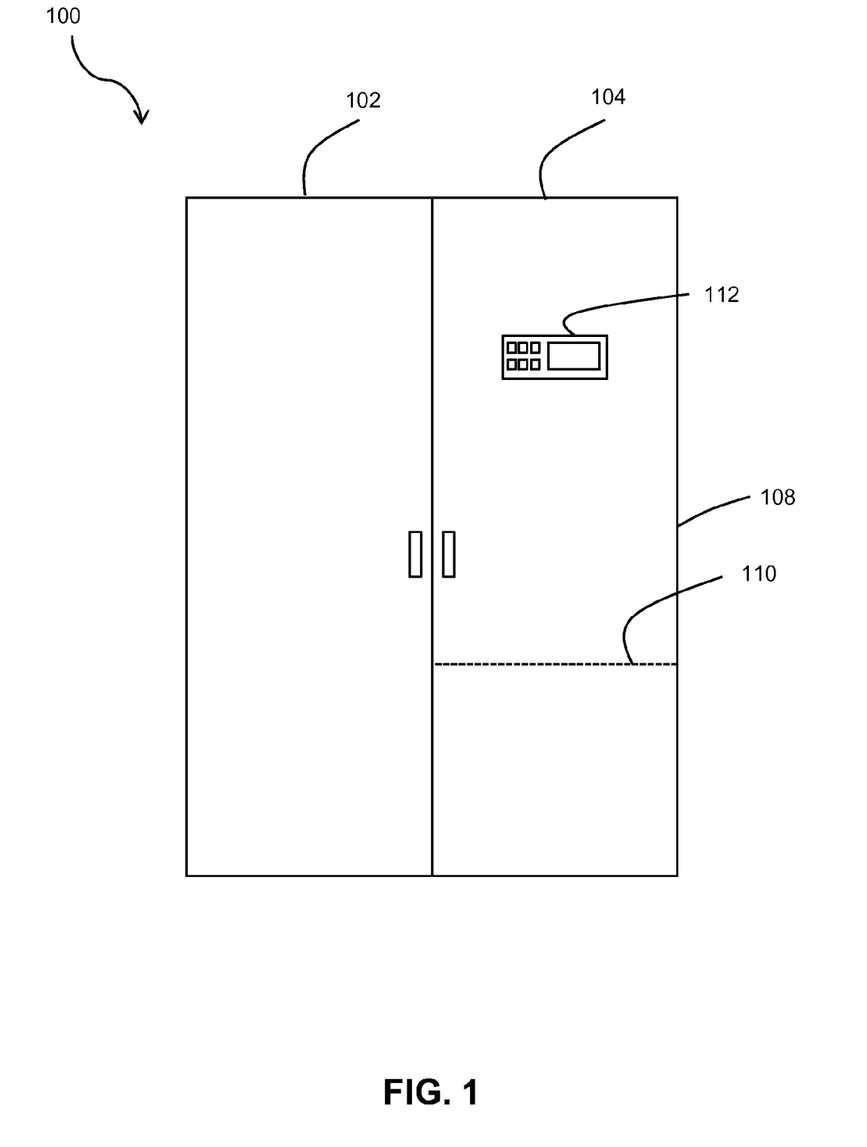
FIG. 1 shows a front view of a refrigerator comprising a defrost chamber.
Figure 2:
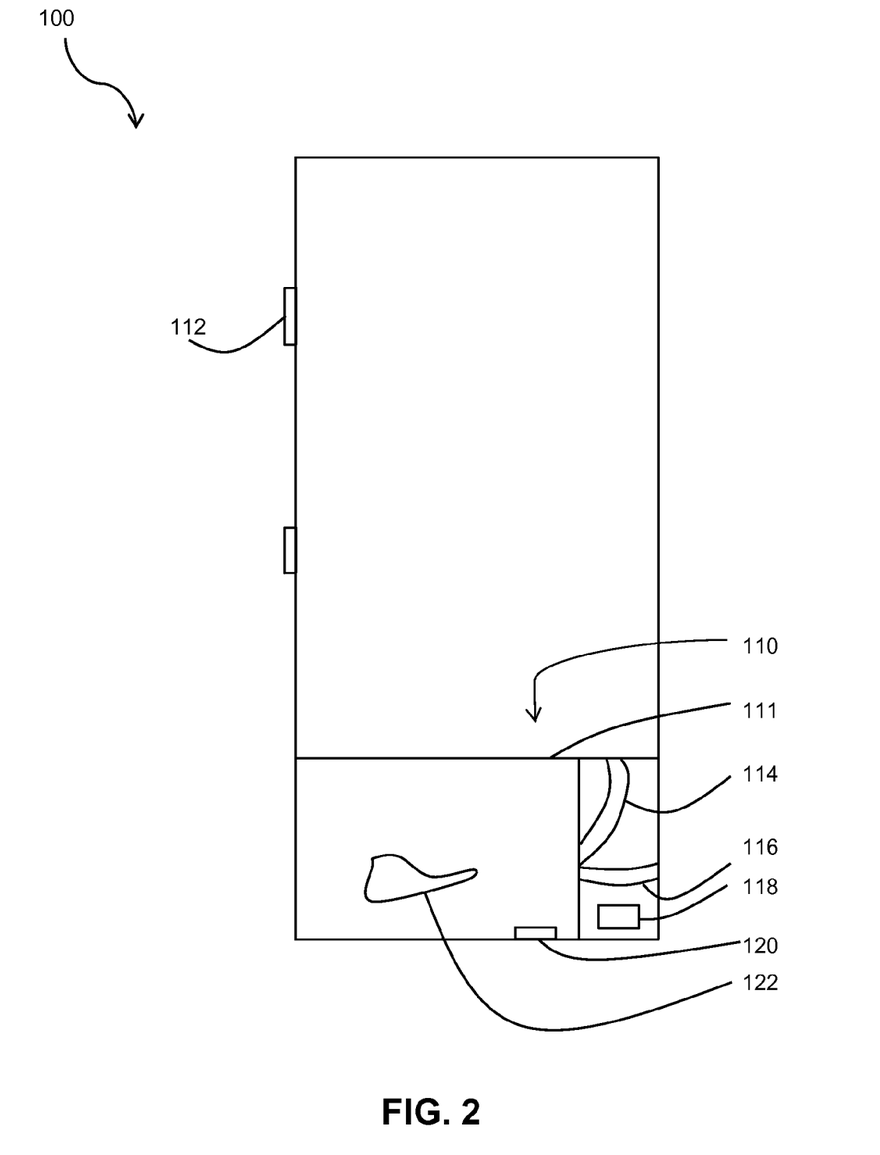
FIG. 2 shows a side sectional view of the refrigerator comprising a defrost chamber.

Referring now to FIGS. 1 to 2, shown therein are front and side views, respectively, of a refrigerator 100 comprising a freezer chamber 102, a refrigeration chamber 104 and a defrost chamber 110. The refrigerator comprises insulated walls 108 minimizing undesired heat transfer between the chambers of refrigerator 100, and the ambient.

The refrigerator 100 comprises refrigeration equipment (not shown) for cooling air in the refrigerator. In an embodiment, refrigeration equipment comprises equipment for carrying out a vapor compression cycle, including a condenser, an expansion valve, an evaporator unit and a compressor. As known to those of skill in the art, the evaporator unit's coil may be positioned to be in fluid communication with the freezer chamber for supplying cooled air within the freezer chamber. Further, fluid communication may be provided between the freezer chamber and the refrigeration chamber for supplying cooled air to the refrigeration chamber. Other embodiments are contemplated. For example, the refrigeration chamber may house its own evaporator coil for supplying cooled air within the refrigeration chamber, without the need for fluid communication with the freezing chamber.

In embodiments, the defrost chamber 110 can be selectively maintained at the temperature of the refrigeration chamber or at the ambient temperature, or at a temperature therebetween, in order to defrost food 122 placed within it. In order to achieve this functionality, the defrost chamber 110 is in selective, controllable fluid communication with the refrigeration chamber and the ambient. The defrost chamber 110 may further be in selective fluid communication with the freezer chamber.

The illustrated embodiment of the defrost chamber 110 comprises a food storage compartment 111, control module 118 and condensation exhaust port 120. The defrost chamber 110 further comprises heat transfer tubes, such as refrigerator tube 114 and ambient tube 116. The refrigerator further comprises display/control panel 112 for controlling functionality of the defrost chamber 110.

The food storage compartment 111 is adapted to receive food for defrosting, such as food 122. Appropriate shelving and spacers may be provided within the food storage compartment 111.

The heat transfer tubes provide fluid communication between the defrost chamber 110 and the freezer chamber 102, the refrigeration chamber 104 and/or ambient air. The heat transfer tubes may be selectively opened or closed for supplying fluid between the chambers. The heat transfer tubes are shown to be provided behind the food storage compartment 111, though in alternate embodiments, the heat transfer tubes may be positioned in alternate positions, such as above or below the compartment. Further, only a refrigerator tube 114 and an ambient tube 116 are shown, but fluid communication may also be directly provided to the freezer chamber. The use of the term "tube" is merely illustrative of components allowing fluid communication and is not intended to be limiting to any particular shape or configuration. For example, heat transfer tubes should be understood to also include conduits and channels shaped into walls or coverings of the refrigerator chambers. Further, it is contemplated that the ambient tube 116 may be provided as a selectively openable cavity below the food storage compartment 111 in order to supply ambient air to the food storage compartment. In such an embodiment, the ambient tube 116 may be provided with an appropriate covering, such as a grate, to ensure that food does not fall through it out of the food storage compartment 111.

The control module 118 comprises mechanical and electrical components sufficient to control fluid communication through the heat transfer tubes in order to ensure control of fluid flow to the food storage compartment. For example, the control module 118 may be adapted to selectively control valves, pumps and/or fans in fluid communication with the food storage compartment in order to control air flow (and heat transfer) to the food storage compartment. The control module 118 may control such valves, pumps and/or fans in response to temperature signals from sensors, such as thermocouples positioned within the defrost chamber 110. The control module 118 may include a timer as described below.

Condensation exhaust port 120 may be provided in order to exhaust any condensation that accumulates within the defrost chamber 110 during use. The condensation exhaust port 120 may comprise an appropriate cavity for exhausting any condensation from within the food storage compartment. Optionally, a grate may be included in order to ensure that food does not fall through the exhaust port 120. Further, the condensation exhaust port may be selectively controlled by the control module, in order to only exhaust condensation at predetermined times or intervals, such as once an hour during a defrost cycle. In some embodiments, the defrost chamber 110 may be at least partly lined with a hydrophobic material and/or shaped to direct condensation to exhaust port 120. For example, side surfaces of the food storage compartment 111 may be coated with a hydrophobic coating or formed of a hydrophobic material, and the bottom surface of the food storage compartment 111 may be slopingly disposed along one or more axes in order to direct condensation to fluid exhaust port 120. In embodiments, the bottom surface may further be coated with a hydrophobic coating. In some embodiments, the condensation exhaust 120 may not be provided if the ambient tube 116 is provided below the food storage compartment 111.

The display/control panel 112 may be adapted with a plurality of push buttons and a display (as shown), to receive user input in order to control the functionality of the defrost chamber 110 and particularly in order to provide input to control module 118 for programming and controlling the defrost chamber. Instead of or in addition to the display/control panel, the control module 118 may include a wireless transceiver, as well as appropriate application program logic, for interfacing with a mobile application on a user device (not shown) for receiving user input.

Figure 3:
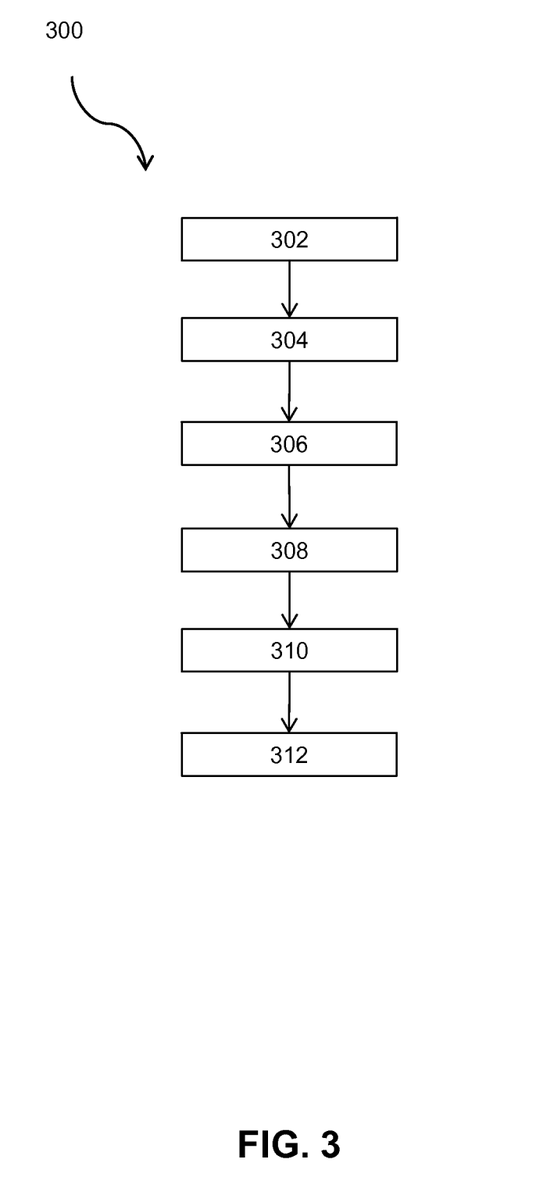
FIG. 3 shows a method for using the refrigerator of FIGS. 1 and 2.

Referring now to FIG. 3, shown therein is a method 300 for using the refrigerator 100. At block 302, a user places food into the food storage compartment 111 of the refrigerator. At block 304, the user provides user input to the control module in order to indicate a desired time for defrosting to commence (i.e. after am amount of time has elapsed, or at a specific time in the future). In embodiments, where multiple heat tubes are provided, the user may further indicate what type(s) of defrosting should be used—i.e. ambient or refrigerated air. User input may be provided, for example, via display/control panel 112 or wirelessly from a mobile application. At block 306, the timer of control module 118 may determine when the desired time is reached, and a defrost cycle may then commence. At block 308, when the defrost cycle commences, the control module 118 may provide ambient air or refrigerated air to the food storage compartment 111, according to the user's selection. At block 310, an alarm may sound after a predetermined amount of time has elapsed during the defrost cycle, reminding the user of the presence of food in the food storage compartment. At block 312, optionally, after a further predetermined amount of time has elapsed, the refrigerator may enter a food spoilage prevention cycle, wherein the food storage compartment 111 is returned to the temperature of the refrigeration chamber 104 or of the freezer compartment 102 in order to minimize the risk of food spoiling, if it is not removed by the user at block 310. It will thus be appreciated that the food spoilage prevention cycle may keep the food storage compartment 111 at a refrigerated temperature cooler than during the defrost cycle.

The further predetermined time after defrosting has begun for engagement of the food spoilage prevention cycle may be preconfigured, manually set at the user input module, or may be automatically determined. Automatic determination of the further predetermined time may rely on a weight of food and possibly on a type of food. As in embodiments described below, the weight may be manually entered as user input or automatically determined if a scale is included. The type of food may be manually entered.

It will be appreciated that, depending on the configuration of the refrigerator, including the positioning of the defrost chamber 110 in either the refrigeration chamber 104 or the freezer chamber 102, or separately therefrom, when the defrost cycle and food spoilage cycle are not in use, the food storage compartment 111 may be maintained at a default temperature comprising the temperature of the refrigeration chamber, the temperature of the freezer chamber or ambient temperature.

In embodiments, at block 308, during the defrost cycle the control module 118 may first selectively provide refrigerated air to the food storage compartment, and then at a later predetermined time or user input time, provide ambient air to the food storage compartment, in order to gradually defrost the user's food 122.

In embodiments, at block 304, the user may further input the type of food and optionally the weight of food in the food storage compartment, in order to permit the automatic generation of an anticipated defrost duration. The anticipated defrost duration will further depend upon the type of defrosting used (i.e. ambient air and/or refrigerated air). In such embodiments, at block 310 the alarm may sound when the anticipated defrost duration has elapsed, indicating to the user that the food is likely defrosted. Further, the food spoilage prevention cycle may automatically commence some further predetermined time after the anticipated defrost time has elapsed—which as above may be determined based on the weight and possibly type of food.

In an alternate embodiment, instead of the user inputting a desired time for defrost cycle to commence, the user may input a desired meal time, as well as the weight and type of food (i.e. meat, poultry, vegetable). In such an embodiment, anticipated defrost duration may be automatically generated, and the defrost cycle can be commenced at an appropriate time so that the user can enjoy their food at the desired meal time. Further, the control module can vary the use of fans and valves, and relative use of ambient or refrigerated air, in order to speed up or slow down anticipated defrost duration as needed, depending on time available for defrosting until the desired meal time. In further alternate embodiments, the user may manually enter an anticipated defrost duration, as well as the desired meal time, and the defrost cycle can be commenced at an appropriate time so that the user can enjoy their food at the desired meal time. Manually time entry may be preferable for foods which are not captured by user interface options (i.e. complex foods other than meat, poultry, and vegetables).

Figure 4:
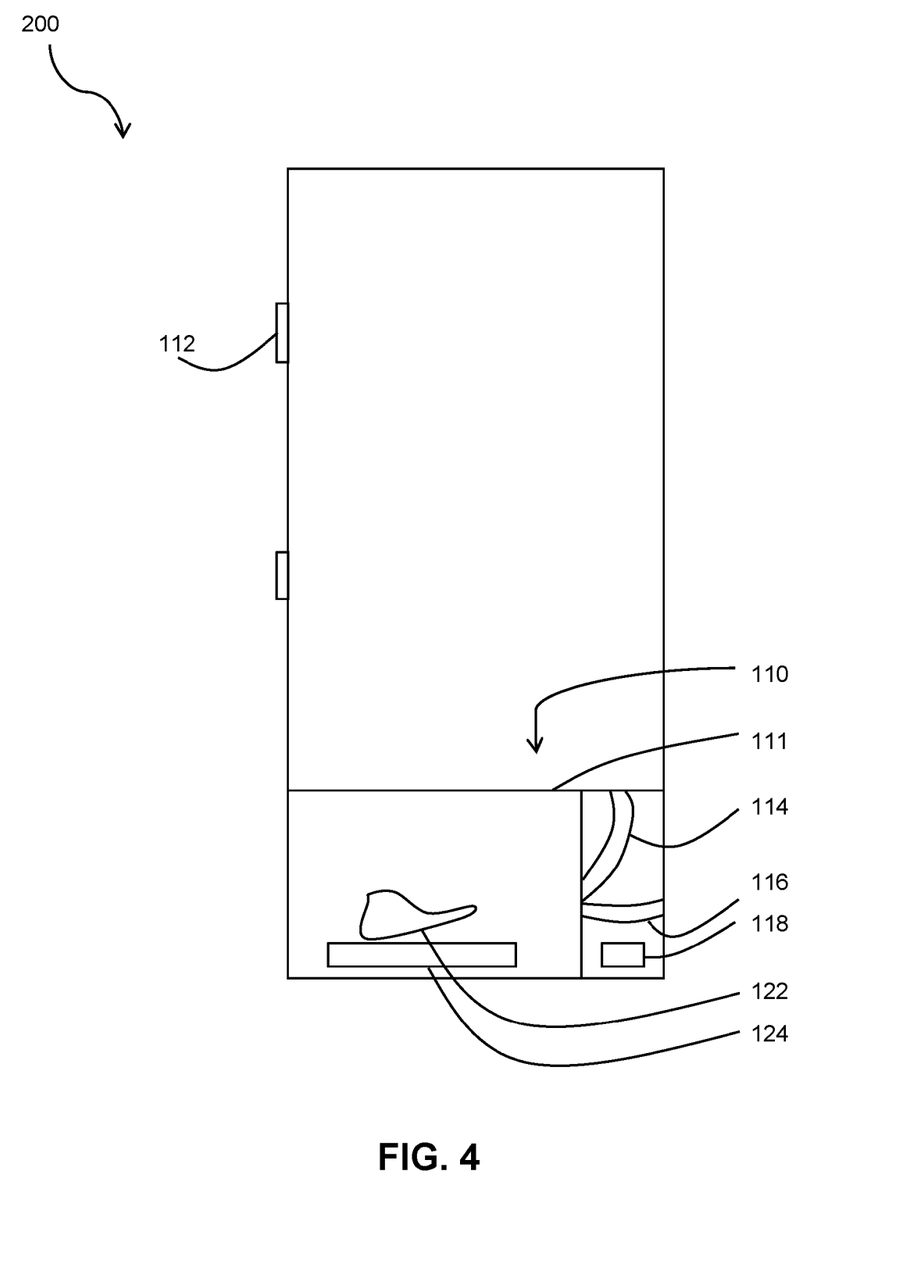
FIG. 4 shows a refrigerator comprising a defrost chamber and a scale.

Referring now to FIG. 4, in alternate embodiments, the defrost chamber 110 comprises a scale 124 in the food storage compartment 122 for weighing food 122 placed within the compartment and providing weight readings to the control module 118. In such embodiments, at block 304, instead of the user inputting the weight of food provided in the food storage compartment, the weight of the food may be automatically determined, simplifying use of the defrost cycle for the user. Though illustrated as covering only part of the food storage compartment 111, the scale may be built into the base of the food storage compartment to appear seamlessly integrated therewith to the user.

In some further embodiments, the anticipated defrost duration may be determined solely on the basis of the weight of the food, without requiring user input with respect to the type of food. Accordingly, a user may provide user input solely indicating a desired meal time, while weight can be automatically measured by scale 124. The control module 118 may then automatically determine an anticipated defrost duration, and commence the defrost cycle at an appropriate time to meet the desired meal time.

Figure 5:
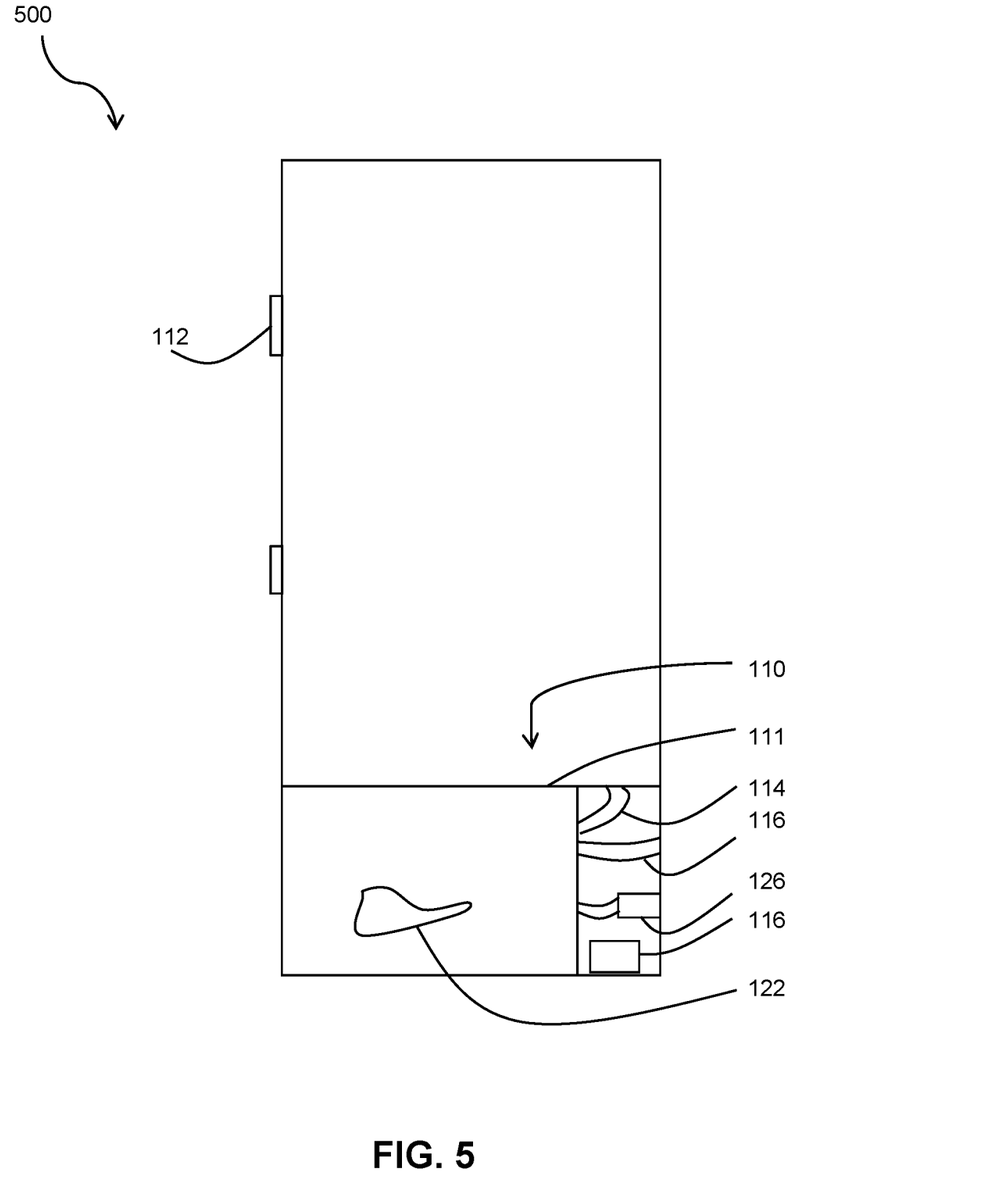
FIG. 5 shows a refrigerator comprising a defrost chamber and a heater unit.

Referring now to FIG. 5, shown therein is an embodiment wherein the defrost chamber 110 further comprises a heating unit 126. In such embodiments, the defrost chamber can be provided with air at a temperature above the ambient in order to further speed up defrosting. The heating unit may comprise an electric heater for generating heat. Alternately, instead of providing heat from a heater within the defrost chamber, the heating unit may comprise a tube in fluid communication with refrigeration equipment of the refrigerator, such as the condenser coil of the refrigerator, in order to reuse heat exhaust from the refrigerator. This embodiment may minimize energy consumption by reusing heat that would otherwise be exhaust by the refrigerator equipment. In embodiments, the heating unit 126 may only be used if the anticipated defrost duration exceeds the allotment of time before the user's desired meal time, in order to speed up defrost.

Figure 6:
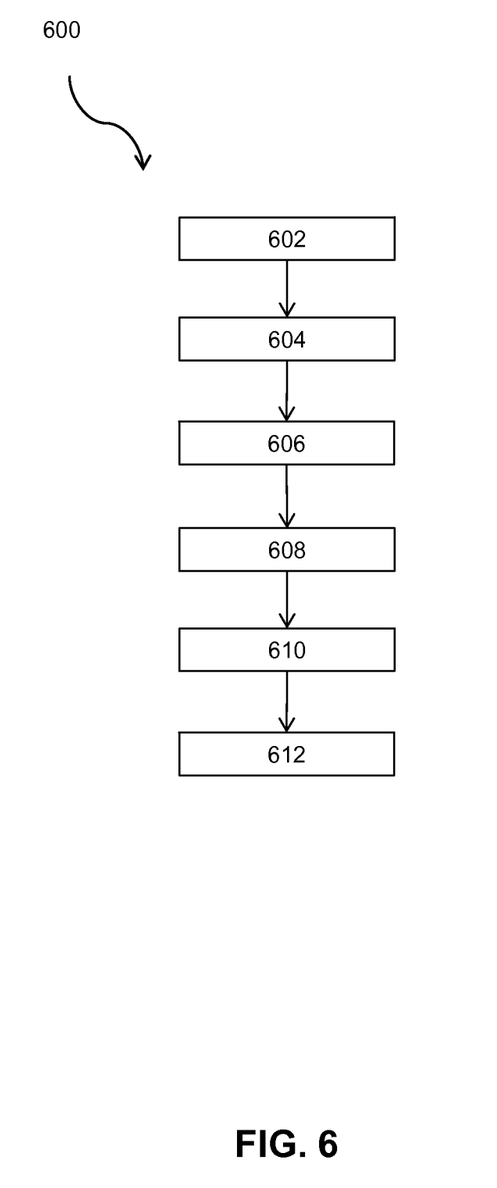
FIG. 6 shows a method for using the refrigerator of FIG. 5.

Referring now to FIG. 6, shown therein is a method for using the refrigerator 500. At block 602, a user places food into the food storage compartment 111 of the refrigerator. At block 604, the user provides user input to the control module indicating a desired meal time. The weight of the food may either be input by the user manually or determined by a scale 124. The user may further input the type of food. The user may further input what types of defrosting can be used (i.e. ambient, refrigerated, heated), and whether the control module should gradually defrost the food (such as by varying the usage of ambient tube 114 and refrigeration tube 112). At block 606, from the desired defrost type, meal time, food weight and optionally food type, the control module 118 may automatically determine an anticipated defrost duration using data available to those of skill in the art relating to defrosting food. Alternately, the user may manually enter the anticipated defrost duration. Using the anticipated defrost duration, the control module 118 may generate a defrost schedule comprising times to selectively activate any included heat transfer tubes. At block 608, at an appropriate time for the desired meal time, a defrost cycle is activated. During the defrost cycle the heat transfer tubes are selectively activated according to the defrost schedule, providing air from the refrigeration chamber, ambient air, and optionally heated air to the food storage compartment 111. In some embodiments, the heating unit 126 may only be activated if the anticipated defrost duration exceeds the allotment of time before the user's desired meal time. At block 610, an alarm may sound after the anticipated defrost duration has elapsed during the defrost cycle, notifying the user that their food should be ready for use. At block 612, optionally, after a predetermined amount of time has elapsed—which may be preconfigured as a default value, manually entered, or automatically determined—the refrigerator may enter a food spoilage prevention cycle, wherein the food storage compartment 111 is returned to the temperature of the refrigeration chamber 104 or of the freezer compartment 102 in order to minimize the risk of the food spoiling, if it is not removed by the user at block 310. The scale may be used to indicate whether the food has been removed by the user. If the food has been removed, the compartment may be returned to its default temperature.

Figure 7:
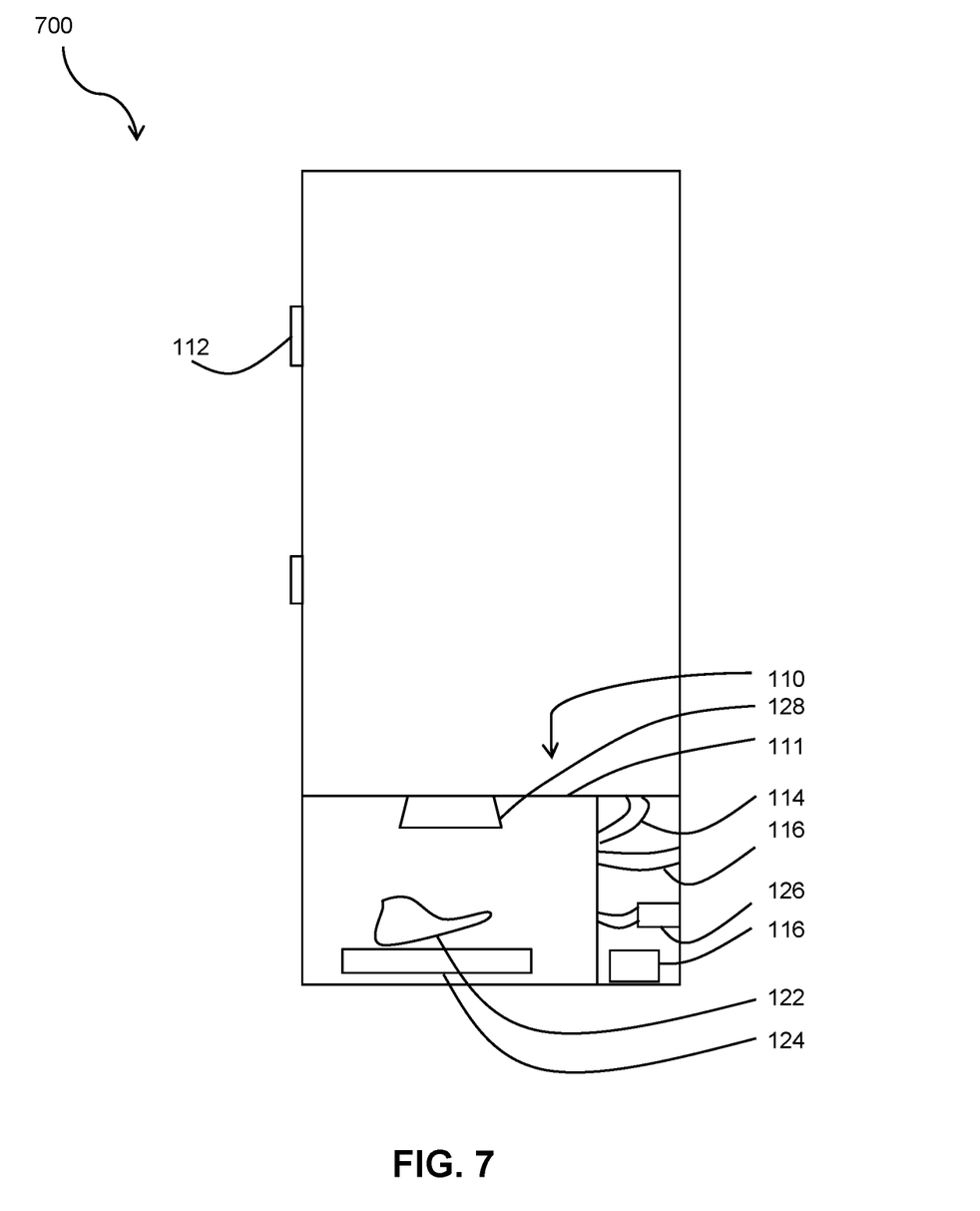
FIG. 7 shows a refrigerator comprising an imaging module configured to image food at wavelengths at least in part outside of the visible spectrum of light.

Referring now to FIG. 7, shown therein is a refrigerator 700 comprising a food imaging module 128. The food imaging module is operable to image the food at least in part at wavelengths outside of the visible spectrum of light in order to generate imaging data. Analysis of the imaging data by the control module can determine the properties of the food, such as the type of food, temperature of the food, and composition of the food. For example, regarding the composition of the food, near-infra-red light can be analyzed to determine the protein/carb content in food. Imaging data may be communicated through a wired or wireless network to a remote computing device for remote analysis of the imaging data. Determination of the type of food may be considered to be a classification problem, wherein the imaging data is classified in order to generate a determination of the type of food. The determined type of the food and/or the other properties can be used in order to automatically determine, optionally in conjunction with the weight of the food, an anticipated defrost time for the food. Accordingly, in some embodiments, the type of food may be automatically determined by the control module 118 upon analyzing imaging data from the imaging module 128, instead of being manually entered.

Further, the control module may retrieve imaging data from the imaging sensor to monitor the temperature of the food, intermittently, at specific predetermined intervals, continuously, or upon the occurrence of particular events—such as at the conclusion of the anticipated defrost time. The control module may thus process the imaging data in order to determine current temperature of the food. The temperature of the food may be measured as a global average, or in some instances a maximum or minimum temperature may be taken to be representative of the temperature of the food. Image processing techniques may be applied. For example image segmentation techniques may be applied in order to separate imaging data relating to the food from empty space and other objects within the defrost chamber. Monitoring the temperature of the food at the conclusion of the anticipated defrost time during a defrost cycle may cause the control module to extend the defrost cycle until the imaging data indicates that the food is actually defrosted—i.e. has reached a manually entered or predetermined temperature for defrost. Further, monitoring the temperature of the food during the defrost cycle may indicate that defrosting should be expedited to meet the desired meal time, if during monitoring the temperature does not meet a desired temperature for a particular point in time during a defrost schedule. Defrosting can be expedited by activating (or intensifying) the heating unit or fans in order to increase the rate of heat transfer to the food. Monitoring the temperature of the food may further cause early or delayed activation of the food spoilage prevention cycle. Particularly, the control module may be configured to monitor at the conclusion of a defrost cycle in order to determine if the food has risen above a particular predetermined temperature—optionally configured for the type of food, or manually entered. If the food rises above the predetermined temperature the food spoilage prevention cycle may be activated.

Although the foregoing has been described with reference to certain specific embodiments, various modifications thereto will be apparent to those skilled in the art without departing from the spirit and scope of the invention as outlined in the appended claims. For example, the figures depict a refrigerator comprising a vertical wall separating the freezer chamber and the refrigeration chamber. It will be appreciated that the refrigeration chamber and freezer chamber could alternatively be separated by a horizontal wall. Further, in the illustrated embodiment, the defrost chamber is accessed from within the refrigeration chamber, though this need not necessarily be the case. The defrost chamber could be separated from either or both of the freezer chamber and refrigeration chamber.

The invention claimed is:

1. A defrost chamber for receiving food comprising:
   a. two or more heat transfer conduits, one of said conduits selectively fluidly coupled to an ambient air source and another of said conduits selectively fluidly coupled to refrigeration equipment for cooling air in the defrost chamber;
   b. a user input module for receiving user input; and
   c. a control module configured to:
      i. determine a weight of the food stored in the defrost chamber;
      ii. receive user input indicating a desired meal time;

iii. automatically generate an anticipated defrost duration corresponding to an expected length of time for the food to defrost; and iv. selectively control, for a period corresponding to the anticipated defrost duration in advance of the desired meal time, the heat transfer conduits to supply ambient air to the food.

2. The defrost chamber of claim 1, wherein the defrost chamber further comprises a scale for providing a measured weight to the control module.

3. The defrost chamber of claim 1, wherein the control module is further configured to control the conduits to fluidly couple the defrost chamber to the refrigeration equipment after a predetermined time has elapsed from the desired meal time.

4. The defrost chamber of claim 1, wherein the user input further indicates a type of food.

5. The defrost chamber of claim 1, wherein the user input further indicates at least one type of defrosting to be used, wherein the types of defrosting comprise any one of ambient air, cooled air, or a combination of ambient air and cooled air.

6. The defrost chamber of claim 1, further comprising a condensation exhaust port for directing condensation to drain from the defrost chamber.

7. The defrost chamber of claim 1, wherein one of the conduits is selectively fluidly coupled to refrigeration equipment for cooling air in the defrost chamber to under zero degrees Celsius.

8. The defrost chamber of claim 1, wherein the defrost chamber further comprises a conduit in selective fluid communication with a heat source.

9. The defrost chamber of claim 8, wherein the heat source comprises a condenser coil of the refrigeration equipment.

10. The defrost chamber of claim 1, wherein the user input module receives user input from an application of a wirelessly paired mobile device.

11. The defrost chamber of claim 1, further comprising an imaging module configured to image the food at wavelengths at least in part outside of the visible spectrum of light and to communicate imaging data to the control module.

12. The defrost chamber of claim 11, wherein the control module is further configured to analyze the imaging data to determine a type of food.

13. The defrost chamber of claim 11, wherein the control module is further configured to analyze the imaging data to monitor the temperature of the food, and to control the conduits to fluidly couple the defrost chamber to the refrigeration equipment upon the temperature of the food reaching a predetermined spoilage temperature.

* * * * *